(Model.)
J. E. FINLEY.
Coffee Pot.
No. 238,036. Patented Feb. 22, 1881.
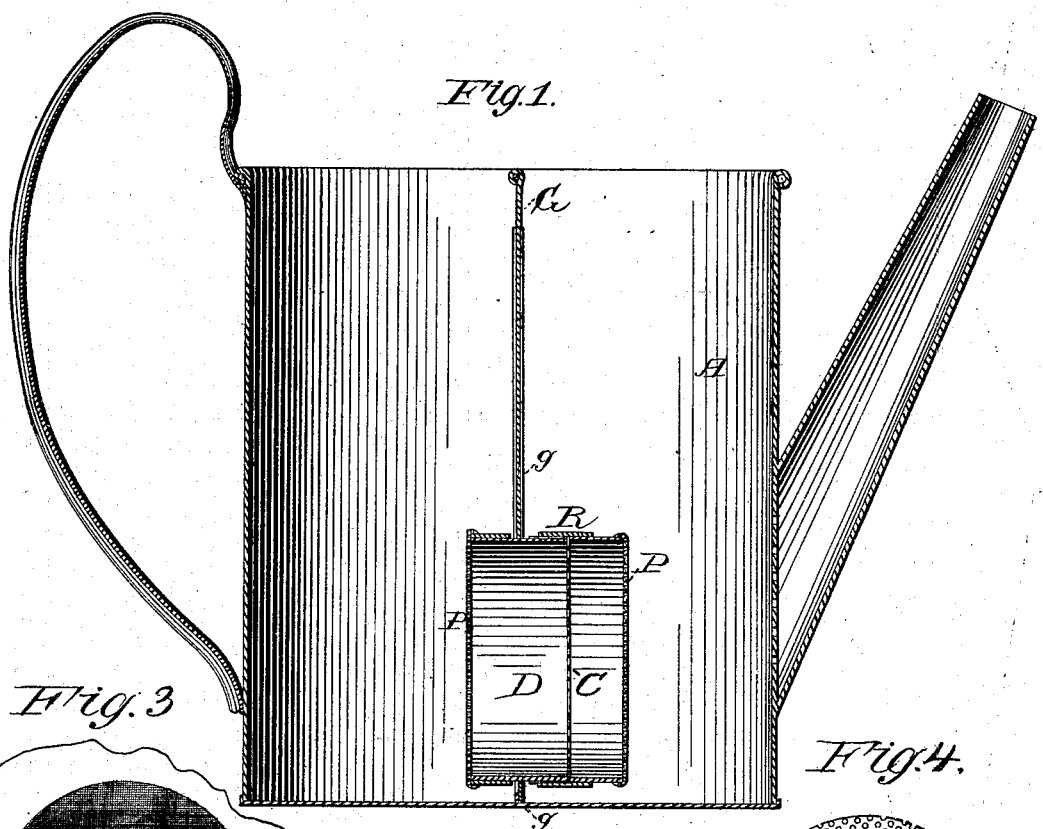
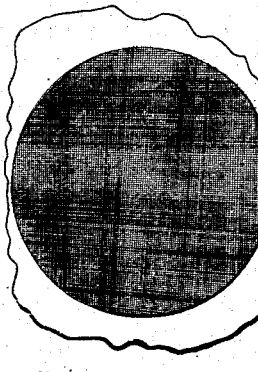
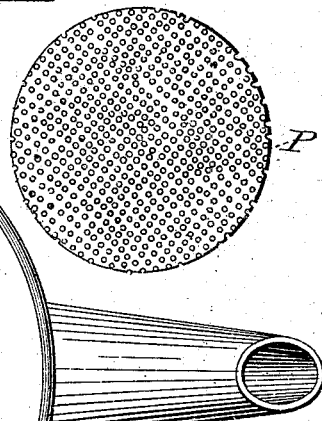
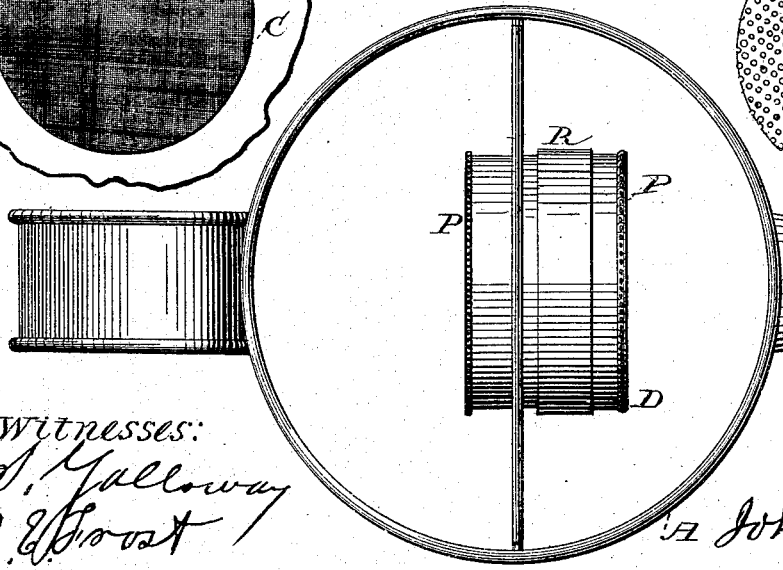
Witnesses: Inventor.
J. S. Galloway John E. Finley
J. E. Frost

UNITED STATES PATENT OFFICE.

JOHN E. FINLEY, OF MEMPHIS, TENNESSEE.

COFFEE-POT.

SPECIFICATION forming part of Letters Patent No. 238,036, dated February 22, 1881.

Application filed August 28, 1880. (Model.)

*To all whom it may concern:*

Be it known that I, JOHN E. FINLEY, a citizen of the United States, residing at Memphis, in the county of Shelby and State of Tennessee, have invented certain new and useful Improvements in Coffee-Pots; and I do hereby declare that the following is a full, clear, and exact description of the invention, which will enable others skilled in the art to which it appertains to make and use the same.

The nature of my improvement consists in the peculiar construction and arrangement of the parts hereinafter mentioned, and which will be more specifically set forth in the claim.

To enable others skilled in the art to which my invention appertains to make and use the same, I will proceed to describe its construction.

Figure 1 represents a sectional view of the coffee-pot, showing the attachment inside of the same. Fig. 2 is a plan view. Fig. 3 is a view showing the cloth or textile fabric used in the coffee-pot. Fig. 4 is a view showing the cap of perforated tin.

A represents the body of the coffee-pot, to the sides of which I attach the grooves $g$ extending across the bottom, as shown at $g$. Into these grooves I make a gate, G, into which I insert the cylinder R through its lower part in such a manner as to allow the gate G to be taken out or placed in position at pleasure. To this cylinder I apply caps P P, of perforated tin, removable, as shown in Fig. 4. I also use cloth when desired, as shown in Fig. 3 and lettered C.

I am aware that perforated tin wire and fabric have been used in various ways and devices to filter coffee from the grounds; but in my manner of using perforated tin or cloth as a strainer I wish to confine myself to the peculiar construction of the device as described and shown in the drawings.

The object of my invention is to make an attachment to coffee-pots in such a manner as to render the coffee, when made, free from all grounds or sediment, and also to prevent the coffee from losing its flavor or aroma, which escapes to a great extent by the old manner of boiling coffee to clear or settle the same. To prevent this I place the ground coffee in the cylinder R, in that part D of the attachment farthest from the spout. I then pour scalding water upon the same, and the water will extract the strength and aroma from the coffee free from the grounds or sediment, which are prevented from being poured out of the coffee-pot, and in this way all the grounds and sediment are kept separate from the coffee to be used. Where an extra clear coffee is desired, the cloth C is used in connection with one of the perforated wire caps P, otherwise both perforated tin caps are used.

All the parts of my invention can readily be detached for the purpose of cleansing.

What I claim as new, and desire to secure by Letters Patent, is—

The cylinder R, applied to the gate G, and having removable caps P P, and cloth or textile fabric C, when used as described and specified.

JOHN E. FINLEY.

Attest:
J. S. GALLOWAY,
J. E. FROST.